Jan. 22, 1957 H. R. JAQUITH 2,778,373
PNEUMATIC PRESSURE SELECTORS
Filed Feb. 18, 1953 2 Sheets-Sheet 1

INVENTOR.
HOWARD R. JAQUITH
BY
ATTORNEY

Jan. 22, 1957   H. R. JAQUITH   2,778,373
PNEUMATIC PRESSURE SELECTORS
Filed Feb. 18, 1953   2 Sheets-Sheet 2

INVENTOR.
HOWARD R. JAQUITH
BY D. Clyde Jones
ATTORNEY

United States Patent Office 2,778,373
Patented Jan. 22, 1957

2,778,373

PNEUMATIC PRESSURE SELECTORS

Howard R. Jaquith, Rochester, N. Y., assignor to Taylor Instrument Companies, Rochester, N. Y., a corporation of New York Application February 18, 1953, Serial No. 337,565

6 Claims. (Cl. 137—112)

This invention relates to various types of pressure responsive mechanisms or relays adapted for employment in pneumatic control systems. More specifically, it relates to a high pressure selector relay for transmitting the higher of two pressures and a high and low limit stop relay for limiting a pressure signal between a minimum value and a maximum value between which values an input pressure to the relay is transmitted without change.

Heretofore, performance of the latter function has necessitated the employment of a three way low pressure stop valve together with a separate pilot valve which snapped when the signal pressure dropped below a predetermined low value and effected the feed of a signal at this low value and, in addition, the employment of another three way high pressure stop valve together with another and separate pilot valve which snapped when the signal pressure exceeded a predetermined high value to effect the feed of a signal at this high value. In other words, four separate devices or instruments have been employed together with considerable and more or less complex piping for interconnecting these devices. As a result there has been an urgent demand and need in the control industry for a more simplified and less costly arrangement to perform this function.

Moreover, there has also been a need in pneumatic control systems of a simple means to transmit the higher of two pressures.

It is therefore an object of this invention to provide a single device to transmit a variable input pressure maintained by the device between predetermined maximum and minimum values or a device to limit a pressure signal between a predetermined maximum and a predetermined minimum value.

It is also an object of this invention to provide a relatively simple and inexpensive device adapted to transmit the higher of two pressures in a pneumatic control system together with a modification thereof adapted to transmit the lower of two pressures.

Figure 1:
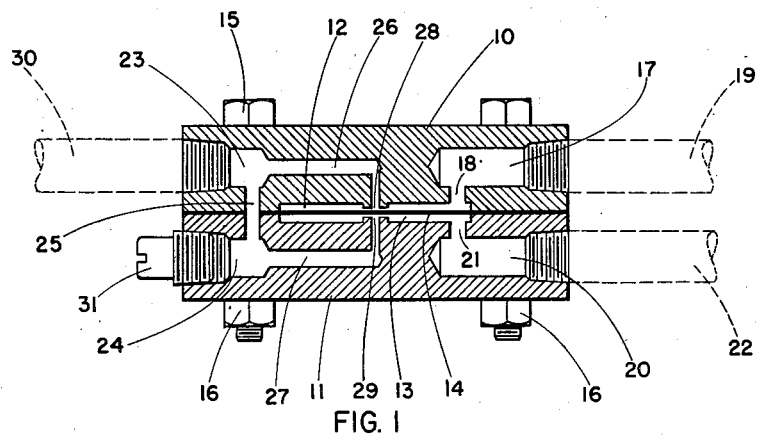
Figure 2:
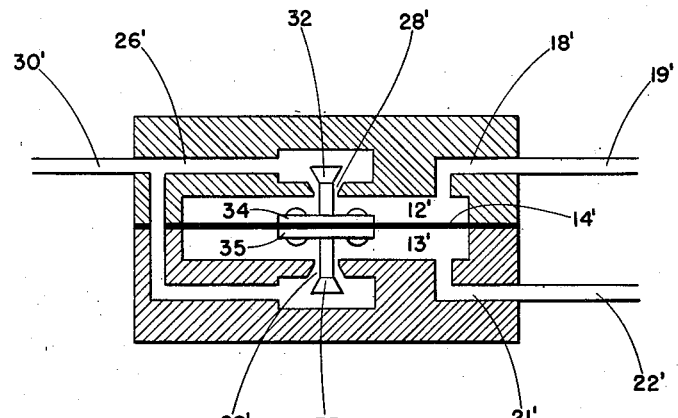
Figure 3:
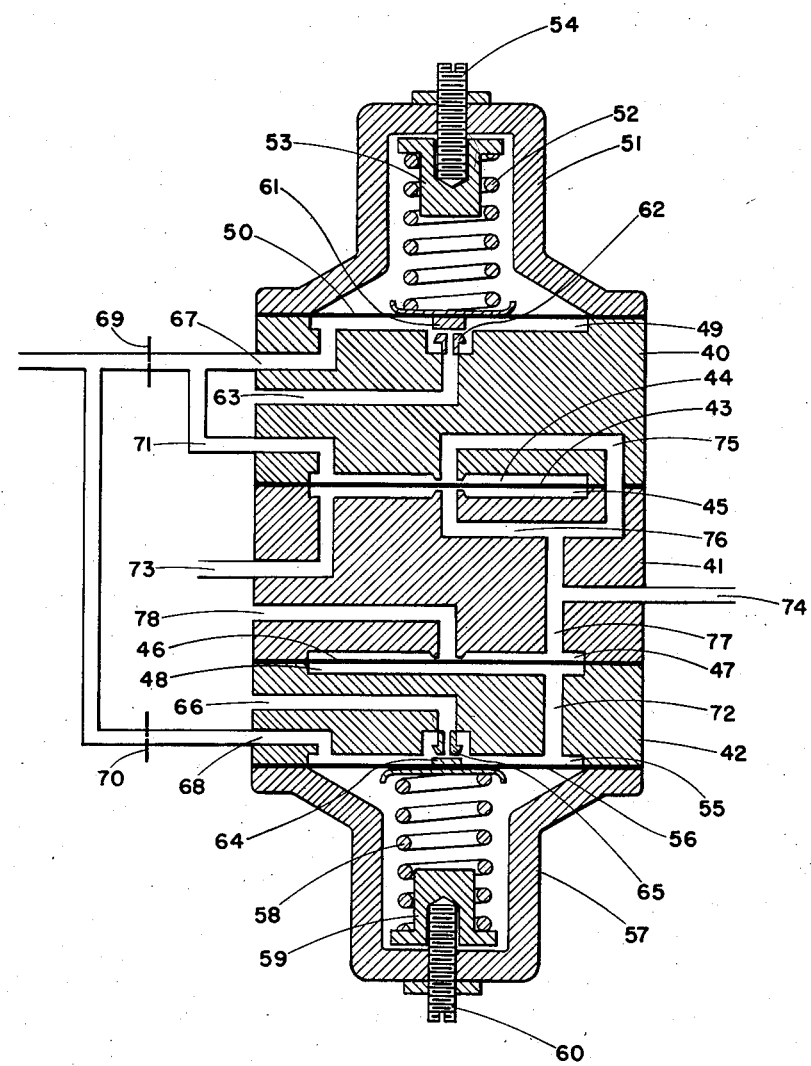

For a complete understanding of my invention, references should be had to the following specification and the accompanying drawings in which Fig. 1 is a cross sectional view of the high pressure selector or device of the invention; Fig. 2 is a cross sectional view of a modification of the Fig. 1 device and Fig. 3 is a cross sectional view through the high and low limit pressure selector of the invention.

Referring to the drawings in detail, I have illustrated in Fig. 1 a high pressure selector or discriminator having a body portion or casing consisting, for example, of a pair of blocks 10 and 11 of a suitable material such as metal and of a suitable external configuration such as circular, square, rectangular, etc. The casing or housing encloses and defines a space or compartment divided into two chambers 12 and 13 by a suitable movable member or wall such as a flexible diaphragm 14 clamped and sealingly maintained between the housing blocks by bolts 15 extending through the blocks and nuts 16 threadedly drawn tightly on the bolts as shown. Casing portion 10 is provided with a tapped opening 17 in communication with chamber 12 through a passageway 18 and for connection of chamber 12 with a source of fluid pressure of a preselected value through a conduit 19, for example. Casing portion 11 is likewise provided with a tapped opening 20 in communication with chamber 13 through a pasageway 21 and for connection of chamber 13 with another source of fluid pressure of a different preseelcted value through a conduit 22. The casing portions are also respectively provided with tapped openings 23 and 24 interconnected by an output passage 25 which in turn is in communication through passageways 26 and 27 respectively with sealable discharge ports 28 and 29 in chambers 12 and 13. An output conduit 30 may be connected with one of the openings in communication with the chambers, such as opening 23 as illustrated while the other opening 24 is sealed off by a plug 31. In addition to the division of the compartment into chambers 12 and 13, the movable member 14 also serves as a seal to seal off either discharge port 28 or discharge port 29 and the sealing of these ports is therefore controlled by the position of movable member 14 with respect thereto.

Thus, in response to a differential pressure in chambers 12 and 13, flexible diaphragm 14 is adapted to engage and seal off one of the discharge ports 28 or 29 depending upon which chamber, 12 or 13 is subjected to the higher pressure. For example, if conduit 19 is connected to a source of fluid pressure greater in magnitude than the source of fluid pressure to which conduit 22 is connected, diaphragm 14 will be flexed into engagement with and so as to seal off discharge port 29 whereupon the fluid of higher pressure value in chamber 12 will be selected or transmitted through discharge port 28 and passage 26 to the output conduit 30. On the other hand, if conduit 22 is connected to a source of fluid pressure greater in magnitude than the source of fluid pressure to which conduit 19 is connected, diaphragm 14 will be flexed into engagement with discharge port 28 and the fluid of higher pressure value in chamber 13 will be transmitted through discharge port 29, passage 27, output passage 25 to the output 30. Thus, a relatively compact and simple device adapted to select and transmit the higher of two fluid pressures has been provided.

In addition, by a relatively simple modification I have also provided a device adapted to select and transmit the lower of two fluid pressures as illustrated more or less diagrammatically in Fig. 2. Although shown diagrammatically, this modification is otherwise substantially identical to the embodiment shown by Fig. 1 with the exception that discharge ports 28' and 29' are provided with valve seats and valves 32 and 33 respectively engageable therewith, are also provided. Valves 32 and 33 are mounted in any suitable manner on a diaphragm 14' for actuation thereby. For example, the valves may be provided with valve stems respectively fixed to or integral with flanges 34 and 35 bolted or riveted together with the diaphragm 14' sealingly interposed therebetween as illustrated. In operation and assuming that chamber 12' on one side of diaphragm 14' is connected through a passageway 18' and conduit 19' to a source of fluid pressure and that chamber 13' is connected through passageway 21' and conduit 22' with another source of fluid pressure greater in value, then diaphragm 14' and the valves mounted thereon will be moved upward so as to bring valve 33 into sealing engagement with its seat while valve 32 will move upwardly away from its seat allowing the fluid of lesser value to be transmitted from chamber 12' through passageway 26' to an output conduit 30'.

With reference to the high and low limit stops or selector relay embodiment of the invention illustrated by Fig. 3, various openings in the device have been shown diagrammatically in the interest of simplicity although it will be appreciated that such openings may be tapped, flanged, etc. to facilitate connection of conduits leading to and from the selector. Otherwise, this device comprises a body portion or casing of three main sections 40, 41 and 42 enclosing a pair of spaced compartments. A movable wall such as a flexible diaphragm 43 sealingly clamped between peripheral portions of sections 40 and 41 divides one of the compartments into chambers 44 and 45 while another flexible diaphragm 46 likewise similarly clamped between casing sections 41 and 42 divides the other compartment into chambers 47 and 48.

The upper half of the assembly comprises the low limit stop and includes a chamber 49 one wall of which is defined by a movable member such as flexible diaphragm 50 the peripheral portions of which are clamped between the casing or housing body section 40 and a cover or end portion 51 of the selector. A biasing means such as a spring 52 is positioned within end portion 51 and interposed between diaphragm 50 and a nut 53 threadedly engageable with an adjusting set screw 54 whereby variable and predetermined forces may be imposed upon the flexible diaphragm. The lower half of the assembly comprises the high limit stop and includes a chamber 55 one wall of which is defined by a flexible diaphragm 56 clamped between the housing section 42 and the opposite end portion 57 of the selector. A biasing means such as spring 58 positioned within end portion 57 is interposed between diaphragm 56 and a nut 59 threadedly engageable with an adjusting set screw 60 to vary and adjust predetermined biasing forces upon the diaphragm.

Diaphragm 50 or a baffle plate 61 affixed thereto is engageable with a nozzle 62 in communication through a passageway 63 with the atmosphere, vacuum or other pressure while a similar baffle plate 64 affixed to diaphragm 56 is engageable with a nozzle 65 which is likewise in communication with the atmosphere, vacuum or other pressure through a passageway 66. In addition to these vent openings, chambers 49 and 55 are each provided with an additional opening in communication respectively through passageways 67 and 68 with a supply source of fluid pressure which may be bled respectively through restrictions 69 and 70. The low limit is adjusted by turning set screw 54 causing spring 52 to exert a predetermined selected force on diaphragm 50 which is opposed by the pressure in chamber 49. Thus, if the pressure in chamber 49 exerts a force greater than the opposing biasing force caused by the spring 52 diaphragm 50 is raised uncapping nozzle 62 whereby the excess is bled to atmosphere until the pressure in chamber 49 becomes equal to the spring biased or mechanically adjusted low limit pressure. Inasmuch as chamber 49 is in communication either directly through a passageway within the device or, as illustrated, by an interconnecting conduit 71 with chamber 44 it will be apparent that the pressure of the fluid in the latter chamber will always be equal to and maintained at the preselected low limit pressure. In a similar manner the fluid pressure in chamber 55 is held to a predetermined high limit or value greater than the pressure in chamber 49 selected by adjusting set screw 60. Since chamber 48 is in communication with chamber 55 through a passageway 72 the pressure in chamber 48 will always be maintained at the preselected high limit value.

A source of fluid pressure which may vary above the high limit pressure and below the low limit pressure is fed to an opening in chamber 45 of the device through an input passageway 73 while the output from the device is discharged through an output passage 74 in communication with chambers 44 and 45 respectively through passageways 75 and 76. Output passage 74 is also in communication through a passageway 77 with chamber 47 which is provided with another opening in communication with the atmosphere through a passageway 78.

Flexible diaphragm 46 is engageable with and adapted to seal off the opening in chamber 47 leading into vent passage 78 while diaphragm 43 is respectively engageable with and adapted to seal off the openings in chambers 44 and 45 leading respectively into output passageways 75 and 76.

Under normal conditions when the pressure value of the input supplied to the device through passage 73 is within the high and low limit values for which the device is adjusted, the pressure in the chamber 45 will be greater than the low limit pressure in chamber 44 causing diaphragm 43 to flex into engagement with and to seal off the opening in chamber 44 leading to output passage 75 whereupon the input will pass through the uncapped opening in chamber 45 into passage 76 and so to the output passage 74 from the device. However, in the event that the pressure value of the input supplied to chamber 45 is less than the preselected low limit value controlled by the nozzle 62-baffle 61-spring 52 combination, diaphragm 43 will be flexed by the opposing and greater pressure in chamber 44 into engagement with the opening in chamber 45 leading to output passage 76 whereupon the device will pass the fluid having a pressure value equal to the low limit through the chamber 44 into the opening leading to passage 75 and so to the output passage 74. On the other hand, in the event that the pressure value of the input supplied to chamber 45 is greater than the preselected high limit value controlled by the nozzle 65-baffle 64-spring 58 combination, diaphragm 43 will of course be flexed into engagement with the output opening in chamber 44 thereby permitting passage of the input fluid through chamber 45 into passage 76. However, inasmuch as this passage is also in communication with chamber 47 and since the pressure value is greater than the selected high limit pressure in chamber 48, diaphragm 46 will be flexed so as to uncap the opening in chamber 47 leading to vent passage 78 whereupon the fluid will be vented therethrough to the atmosphere until it is equal in value to the high limit value. Consequently, the fluid pressure passed to output passage 74 will never exceed in magnitude the high limit value.

Although adjustable biasing means 52 and 58 have been disclosed as being employed in the particular embodiment of the device illustrated and the description has centered around the device as having passage 71 and chamber 44 connected to a source of fixed pressure lower than the value of the pressure source to which passage 72 and chamber 48 are connected, it should be understood that the biasing means may be omitted and passages 71 and 72 or 68 may be respectively connected to any fixed sources of pressure outside the device itself with the source connected to passage 71 of greater pressure magnitude than the source connected to passage 72 or 68. Thus fluid at a pressure equal to the pressure source connected to passage 72 or 68 would be passed to the output passage 74 provided the value of the pressure source connected to passage 73 was greater than either of the fixed sources of pressure. Moreover any one or more of the three passages may be connected to a variable source of pressure with various advantageous results which will be apparent to those skilled in the art. Just for example, passage 71 may be connected to a variable source of fluid pressure, passage 72 connected to another variable source of fluid pressure and passage 73 to a fixed source of fluid pressure. Then, assuming at any given moment that the fluid source connected to passage 71 has a pressure value lower than the pressure source connected to passage 72 but higher than the fixed pressure source connected to passage 73, the fluid from the pressure source connected to passage 71 will be passed to the output passage 74.

While I have, in accordance with the statutes, shown and described particular embodiments of my invention and modifications thereof it will be obvious that changes and modifications can be made without departing from the invention in its broader aspect and I, therefore, aim in the appended claims to cover all such changes and modifications as fall within the true spirit and scope of the invention.

What I claim as new and desired to secure by Letters Patent of the United States is:

1. In a fluid pressure limiter having means for limiting a pressure signal between a minimum and a maximum value and for transmitting input pressures between these values, a housing having a compartment and a movable diaphragm therein, said diaphragm dividing said compartment into two chambers, each of said chambers having an opening therein, said diaphragm being respectively engageable with and adapted to seal said openings, said limiter having an output passage in communication with each of said openings and with said chambers, an input passage in communication with one of said chambers and with a source of fluid pressure variable in value and a source of fluid pressure fixed in value in communication with the other of said chambers whereby said opening in said one chamber will be closed by said diaphragm when the pressure therein is exceeded by the pressure in said other chamber to permit the flow of fluid fixed in value in said other chamber through the other of said openings to said output passage and the opening in said other chamber will be closed by said diaphragm when the pressure therein is exceeded by the pressure in said one chamber to permit the flow of fluid variable in value therein through the opening of said one chamber to said output passage.

2. In a fluid pressure limiter having means for limiting a pressure signal between a minimum and maximum value and for transmitting an input pressure between these values, a housing having a compartment and a movable diaphragm therein, said diaphragm dividing said compartment into two chambers, each of said chambers having an opening therein, said diaphragm being respectively engageable with and adapted to seal said openings, said limiter having an output passage in communication with each of said openings and with said chambers, an input passage in communication with one of said chambers and with a source of fluid pressure and another source of fluid pressure in communication with the other of said chambers whereby said opening in said one chamber will be closed by said diaphragm when the pressure therein is exceeded by the pressure in said other chamber to permit the flow of fluid in said other chamber through the other of said openings to said output passage and the opening in said other chamber will be closed by said diaphragm when the pressure therein is exceeded by the pressure in said one chamber to permit the flow of fluid in said one chamber through the opening of said one chamber to said output passage.

3. A high and low limit fluid relay including an enclosing casing having a pair of spaced compartments therein, flexible diaphragms respectively dividing each of said compartments into two chambers, said relay having an output passage respectively in communication with an opening in each of said chambers in one of said compartments and with an opening in one of the chambers in the other of said compartments, the diaphragm in said one compartment being respectively engageable with and adapted to seal said openings in said chambers defined thereby, an input passage in communication with one of the chambers in said one compartment and with a source of fluid pressure variable in value, a source of fluid pressure fixed at a predetermined minimum value in communication with the other of said chambers in said one compartment whereby said opening in said one chamber will be closed by said diaphragm when the pressure therein is exceeded by the pressure in said other chamber to permit the flow of said fluid fixed at a predetermined minimum value in said other chamber through the other of said openings to said output passage and the opening in said other chamber will be closed by said diaphragm when the pressure therein is exceeded by the pressure in said one chamber to permit the transfer of fluid variable in value therein through the opening of said one chamber to said output passage, said relay having a vent opening in said one chamber in said other compartment in communication with the atmosphere, the diaphragm of said other compartment being engageable with and adapted to seal said vent opening and a source of fluid pressure fixed at a predetermined maximum value in communication with the other of said chambers in said other compartment whereby the diaphragm in said other compartment will engage and seal said vent opening when the pressure of said fluid transferred to said output passage is exceeded by said predetermined maximum pressure in said other chamber of said other compartment and said diaphragm will disengage said vent opening when the pressure of the fluid in said output passage exceeds said predetermined maximum pressure to vent said fluid in said one chamber of said other compartment to maintain said transferred fluid through said output passage at a pressure equal to or less than said predetermined maximum pressure.

4. A fluid pressure responsive device comprising an enclosing casing defining a compartment in said device, a movable diaphragm dividing said compartment into a pair of chambers, each of said chambers having a sealable discharge port therein, said casing having an output passage in communication with each of said openings and with said chambers, a pair of valves positioned respectively adjacent said chambers on opposite sides of said diaphragm and fixedly mounted thereon, said valves being respectively engageable with said discharge ports in response to movements of said diaphragm, a source of fluid pressure of a given magnitude in communication with one of said chambers and a source of fluid pressure of a different magnitude than said first mentioned pressure source in communication with the other of said chambers, said diaphragm being responsive to the differential pressure between said sources of fluid pressure to move said valve adjacent said chamber in communication with the higher of said sources of fluid pressure into sealing engagement with said discharge port therein and permit the transmission of fluid from the lower of said sources of fluid pressure through said discharge port in the other of said chambers to said output passage.

5. In a fluid pressure responsive device adapted to transmit fluid from one of two sources of fluid pressure, a flexible member within said device dividing a space therein into a pair of chambers and movable in response to changes in fluid pressure from said sources, the entire peripheral portion of said flexible member being fixed and sealingly maintained so as to define an impervious wall between said pair of chambers, one of said chambers being always in communication with one of said sources of fluid pressure, the other of said chambers being always in communication with the other of said sources of fluid pressure, each of said chambers having a sealable discharge port, said flexible member being positioned in said device relative to the openings of said discharge ports so as to be substantially parallel thereto, the sealing of said discharge ports being respectively controlled by the position of said flexible member with respect thereto.

6. A fluid pressure selector adapted to transmit fluid from one of two sources of fluid pressure and comprising an enclosing casing having a compartment and a flexible member dividing said compartment into a pair of chambers, one of said chambers being always in communication with one of said sources of fluid pressure, the other of said chambers being always in communication with the other of said sources of fluid pressure, the entire peripheral portion of said flexible member being fixed and sealingly maintained so as to define an impervious wall between said pair of chambers, said flexible member being otherwise movable in response to changes in fluid pressure from said sources, each of said chambers having a sealable discharge port therein, said flexible member being positioned within said casing substantially normal to the axes of said discharge ports, said casing having an output passage physically connected to said sealable ports and in communication with each of said chambers through said ports, the sealing of said discharge ports being controlled by the position of said flexible member with respect thereto, said flexible member being responsive to a differential pressure between said sources of fluid pressure in said chambers to seal off said discharge port in one of said chambers and permit the passage of fluid from one of said sources through the other of said ports into said output passage.

References Cited in the file of this patent

UNITED STATES PATENTS

| | | |
|---|---|---|
| 1,780,589 | Hendrix | Nov. 4, 1930 |
| 1,842,825 | Cunningham | Jan. 26, 1932 |
| 2,145,114 | Gibbs | Jan. 24, 1939 |
| 2,652,847 | Segebarth | Sept. 22, 1953 |

FOREIGN PATENTS

| | | |
|---|---|---|
| 323,785 | France | Mar. 14, 1903 |
| 909,482 | France | Dec. 20, 1945 |